(12) United States Patent
Osterholm et al.

(10) Patent No.: US 10,021,865 B1
(45) Date of Patent: Jul. 17, 2018

(54) TROLLING WEIGHT

(71) Applicants: Charles D. Osterholm, Cocolalla, ID (US); Charles Lonnie Osterholm, Deer Park, WA (US)

(72) Inventors: Charles D. Osterholm, Cocolalla, ID (US); Charles Lonnie Osterholm, Deer Park, WA (US)

( * ) Notice: Subject to any disclaimer, the term of this patent is extended or adjusted under 35 U.S.C. 154(b) by 114 days.

(21) Appl. No.: 15/335,213

(22) Filed: Oct. 26, 2016

Related U.S. Application Data

(60) Provisional application No. 62/246,530, filed on Oct. 26, 2015.

(51) Int. Cl.
*A01K 95/00* (2006.01)

(52) U.S. Cl.
CPC .................................. *A01K 95/00* (2013.01)

(58) Field of Classification Search
CPC ........................................................ A01K 95/00
See application file for complete search history.

(56) References Cited

U.S. PATENT DOCUMENTS

| | | | | |
|---|---|---|---|---|
| 1,127,747 A * | 2/1915 | Fackenthall | ........... | A01K 95/00 43/44.96 |
| 1,701,444 A * | 2/1929 | Darr | ........... | A01K 85/00 43/42.47 |
| 2,201,082 A * | 5/1940 | Dobbins | ........... | A01K 95/00 43/42.48 |
| 2,256,768 A * | 9/1941 | Taylor | ........... | A01K 95/00 43/44.96 |
| 2,605,577 A * | 8/1952 | Waugler | ........... | A01K 85/02 43/34 |
| 2,753,652 A * | 7/1956 | Romaine | ........... | A01K 95/00 29/433 |
| 2,788,605 A * | 4/1957 | Rediess | ........... | A01K 95/00 43/43.1 |
| 2,906,055 A * | 9/1959 | Pizzani | ........... | A01K 95/00 43/43.14 |
| 3,104,487 A * | 9/1963 | Havel | ........... | A01K 95/00 43/43.11 |
| 3,181,265 A * | 5/1965 | Cook | ........... | A01K 95/00 43/42.36 |
| 3,393,467 A * | 7/1968 | Potter | ........... | A01K 91/02 43/43.12 |
| 3,570,167 A * | 3/1971 | Smith | ........... | A01K 91/08 43/42.06 |

(Continued)

*Primary Examiner* — Christopher P Ellis
(74) *Attorney, Agent, or Firm* — Plager Schack LLP

(57) ABSTRACT

A trolling weight is designed to sink while minimizing drag. The trolling weight has a forward bulb arranged as a paraboloid configured to reduce the drag while the trolling weight is moving. The forward bulb truncates to a rearward portion. A first stabilizing fin is attached to the forward bulb and further comprising a first smooth parabolic planar portion which convex from a first apex that connects the forward bulb and the rearward portion. An internal spine is attached to the first stabilizing fin, and further comprising a plurality of upper attachment holes configured to connect cables to pull the trolling weight forward. A tail fin is attached to the internal spine by a plurality of connectors embedded within the forward bulb and arranged rearward of the rearward portion of the forward bulb and further comprising a plurality of rear attachment holes for attaching accessories.

8 Claims, 4 Drawing Sheets

(56) References Cited

U.S. PATENT DOCUMENTS

| | | | | |
|---|---|---|---|---|
| 3,940,871 | A * | 3/1976 | Evans | A01K 91/08 43/43.13 |
| 4,058,926 | A * | 11/1977 | Harrigan | A01K 95/00 43/43.12 |
| 4,237,644 | A * | 12/1980 | Hansen | A01K 91/08 43/43.13 |
| 5,101,592 | A * | 4/1992 | Merritt | A01K 95/00 114/294 |
| 5,305,543 | A * | 4/1994 | Fore | A01K 95/00 43/42.36 |
| 5,784,828 | A * | 7/1998 | Thompson | A01K 95/00 43/44.87 |
| 5,918,408 | A * | 7/1999 | Laney | A01K 95/005 43/43.13 |
| 6,006,464 | A * | 12/1999 | Tregre | A01K 95/00 43/42.31 |
| 6,073,386 | A * | 6/2000 | Firmin | A01K 95/00 43/44.87 |
| 9,554,566 | B2 * | 1/2017 | Majszak | A01K 91/08 |
| 2005/0076558 | A1 * | 4/2005 | Jeffers | A01K 95/00 43/44.87 |
| 2011/0047857 | A1 * | 3/2011 | Miller | A01K 85/02 43/44.97 |
| 2015/0089860 | A1 * | 4/2015 | Temple | A01K 95/00 43/43.1 |

* cited by examiner

TROLLING WEIGHT

RELATED APPLICATION

This application claims priority to provisional patent application U.S. Ser. No. 62/246,530 filed on Oct. 26, 2015, the entire contents of which is herein incorporated by reference.

BACKGROUND

The embodiments herein relate generally to equipment that can be used to catch fish. By way of background, trolling is fishing by trailing a baited line along behind a boat that is moving forward.

Prior to embodiments of the disclosed invention, trolling weights were effective at lowering hooks into the water, but they created too much drag, causing an unnatural water pattern and scaring away fish. Embodiments of the disclosed invention solve these problems.

SUMMARY

A trolling weight is designed to sink while minimizing drag. The trolling weight has a forward bulb arranged as a paraboloid configured to reduce the drag while the trolling weight is moving. The forward bulb truncates to a rearward portion. A first stabilizing fin is attached to the forward bulb and further comprising a first smooth parabolic planar portion which convex from a first apex that connects the forward bulb and the rearward portion. An internal spine is attached to the first stabilizing fin, and further comprising a plurality of upper attachment holes configured to connect cables to pull the trolling weight forward. A tail fin is attached to the internal spine by a plurality of connectors embedded within the forward bulb and arranged rearward of the rearward portion of the forward bulb and further comprising a plurality of rear attachment holes for attaching accessories.

In some embodiments, a second stabilizing fin can be attached to the forward bulb and further comprising a second smooth parabolic planar portion which convex from a second apex that connects the forward bulb and the rearward portion. A third stabilizing fin can be attached to the forward bulb and further comprising a third smooth parabolic planar portion which convex from a third apex that connects the forward bulb and the rearward portion. A fourth stabilizing fin can be attached to the forward bulb and further comprising a fourth smooth parabolic planar portion which convex from a fourth apex that connects the forward bulb and the rearward portion.

In some embodiments, the rear attachment holes can further comprise a rear attachment top hole, a rear attachment middle hole and a rear attachment bottom hole. In some embodiments, a reversible directional fin can be attached to the rear attachment top hole and the rear attachment bottom hole. In some embodiments, a camera can be attached to the rear attachment top hole. In some embodiments, one of the connectors can connect the internal spine and the tail fin perpendicularly.

BRIEF DESCRIPTION OF THE FIGURES

The detailed description of some embodiments of the invention is made below with reference to the accompanying figures.

DETAILED DESCRIPTION OF CERTAIN EMBODIMENTS

Figure 1:
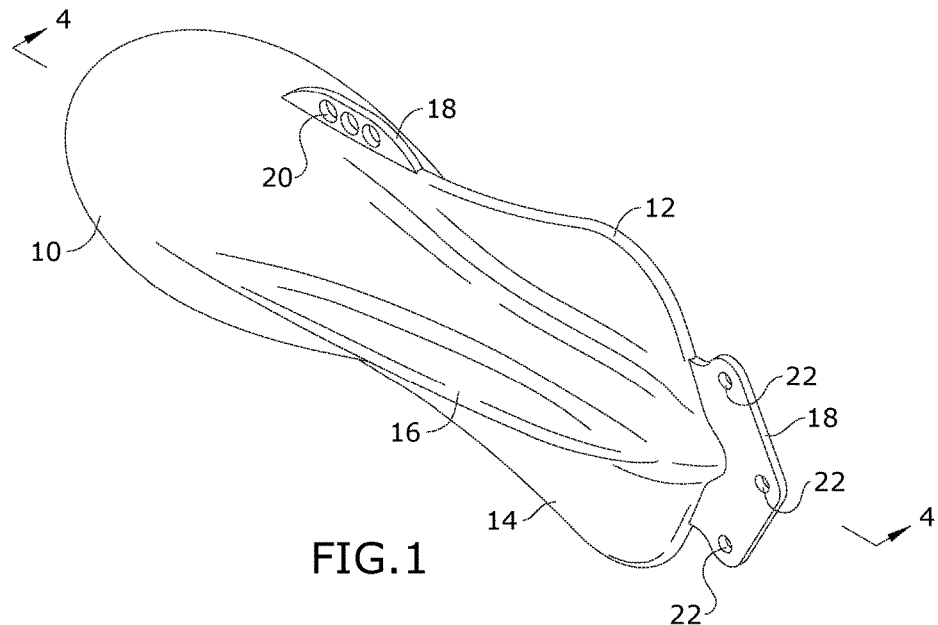
FIG. 1 shows a perspective view of one embodiment of the present invention.
Figure 2:
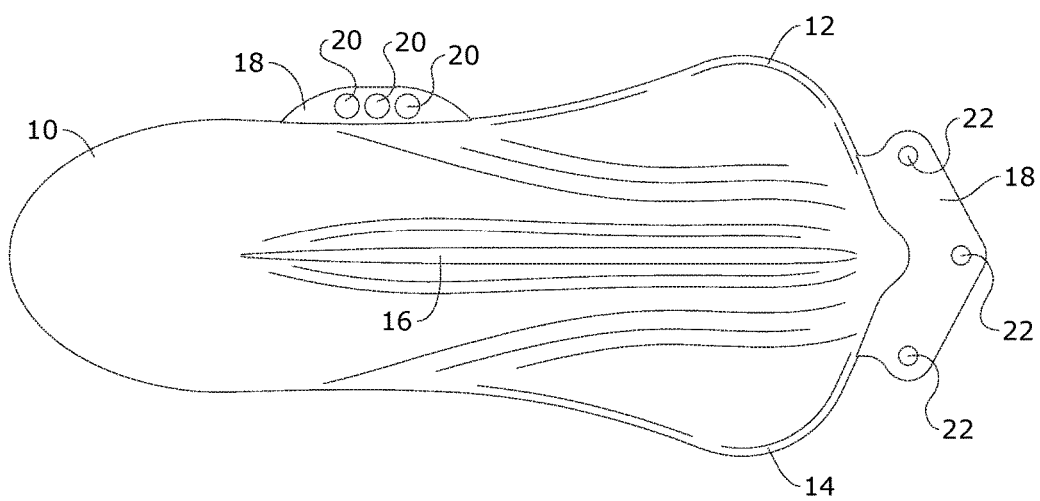
FIG. 2 shows a front view of one embodiment of the present invention.
Figure 3:
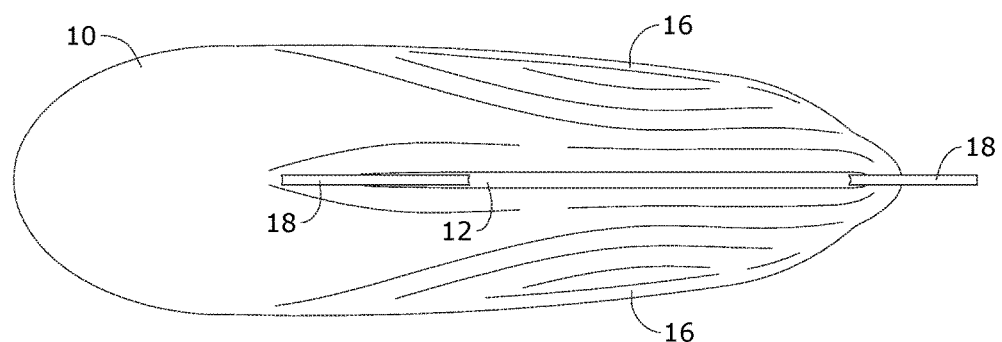
FIG. 3 shows a top view of one embodiment of the present invention.

By way of example, one embodiment of the trolling weight comprises a weight body 10 with a front end having a forward bulb 12 and a rear end having a tail fin 14. A plurality of stabilizing fins are smoothly connected to the forward bulb that runs through the rear end of the body. Further, an internal spine 16 is attached to one of the plurality of stabilizing fins towards the forward bulb while the tail fin extends through the rear of the body. The internal spine and the tail fin are connected by a plurality of connectors 18 embedded within the body. The internal spine and tail fin further comprises a plurality of upper 20 and rear attachment holes 22, respectively. Pulling the trolling weight forward by the internal spine causes water to be channeled by the plurality of stabilizing fins to minimize drag.

Turning to these components in more detail, the forward bulb is hydrodynamically engineered that allows water to flow around it with very little or no resistance, minimizing any drag profile. The bulb has a parabolic shape that lowers the drag by reducing friction between the surface of the trolling weight and the fluid while moving. Further the stabilizing fins comprise an upper fin 24, a lower fin 26 and side fins 28 that are connected to the forward bulb and runs through the rear end of the body. The fins are perpendicularly attached to the body, forming a 90-degree angle between adjacent fins as seen in rear view. The hydrodynamically engineered stabilizer fins keep the weight tracking perfectly while creating little or no drag profile and also provide directional movement.

Figure 4:
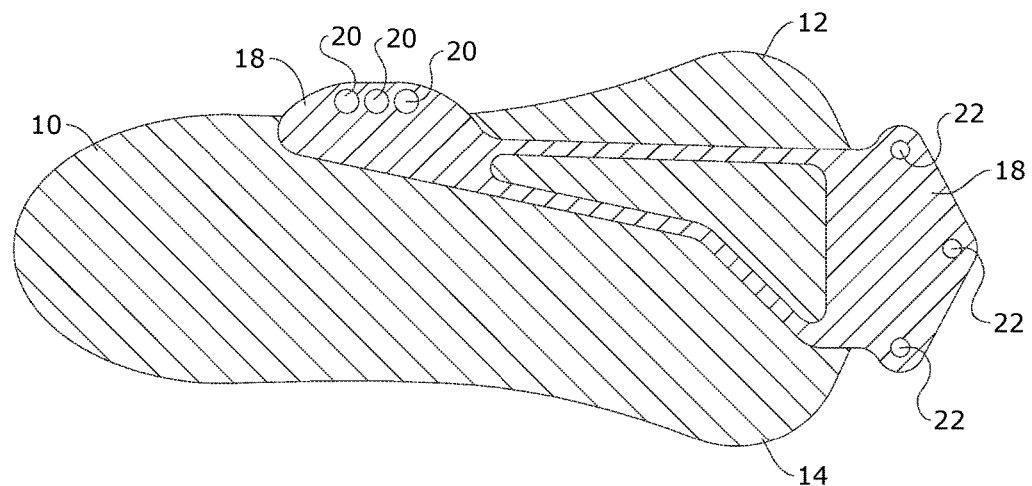
FIG. 4 shows a section view, taken along line 4-4 in FIG. 1, of one embodiment of the present invention.
Figure 5:
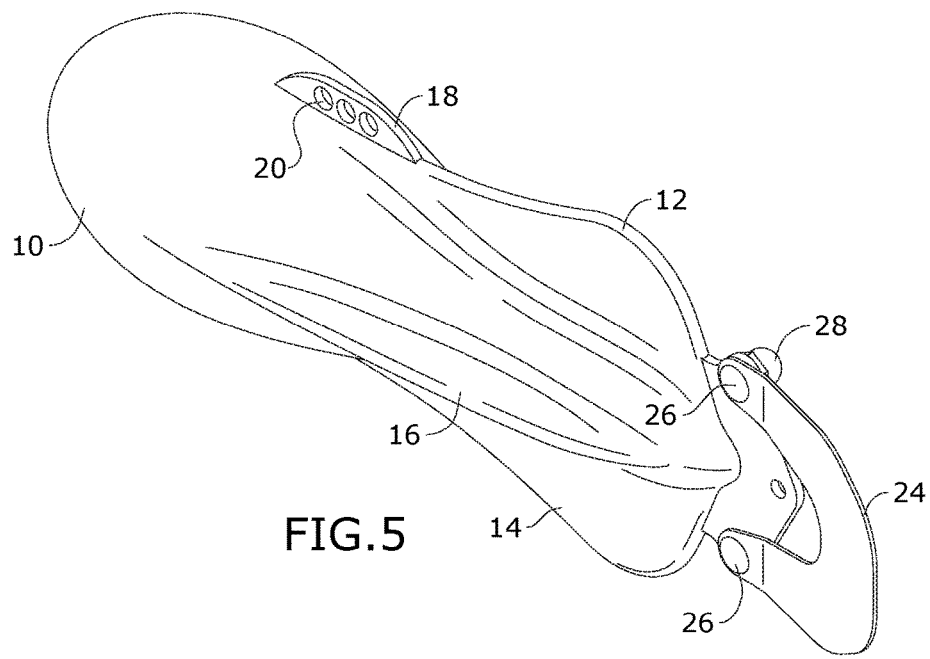
FIG. 5 shows a perspective view of one embodiment of the present invention, shown with an optional fin attached.
Figure 6:
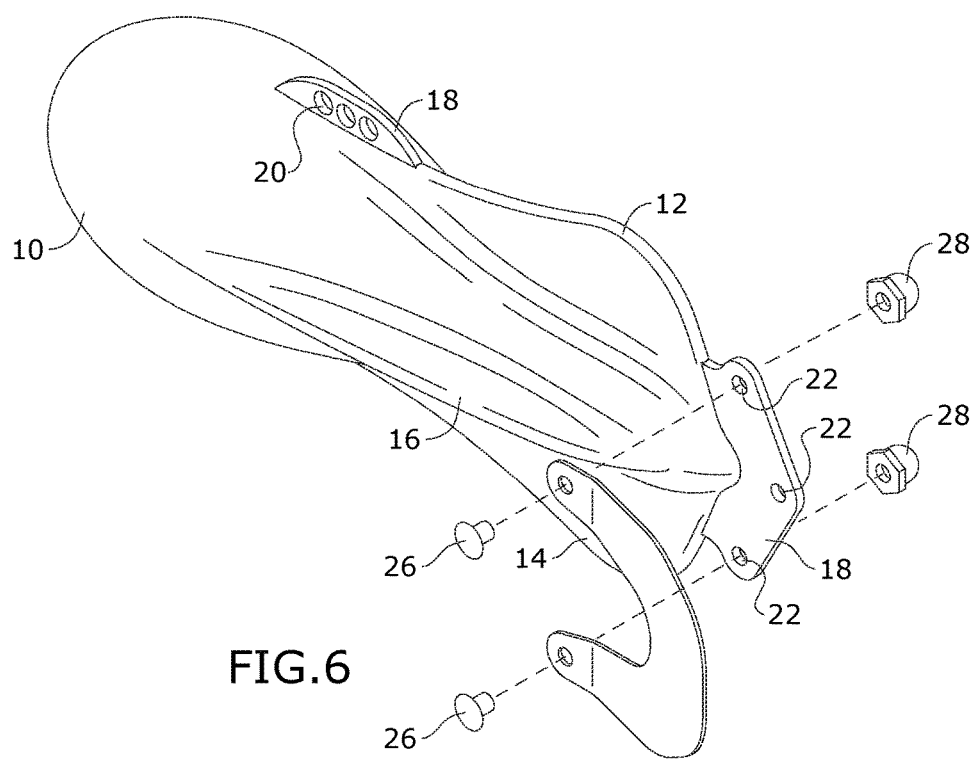
FIG. 6 shows an exploded view of the fin.
Figure 7:
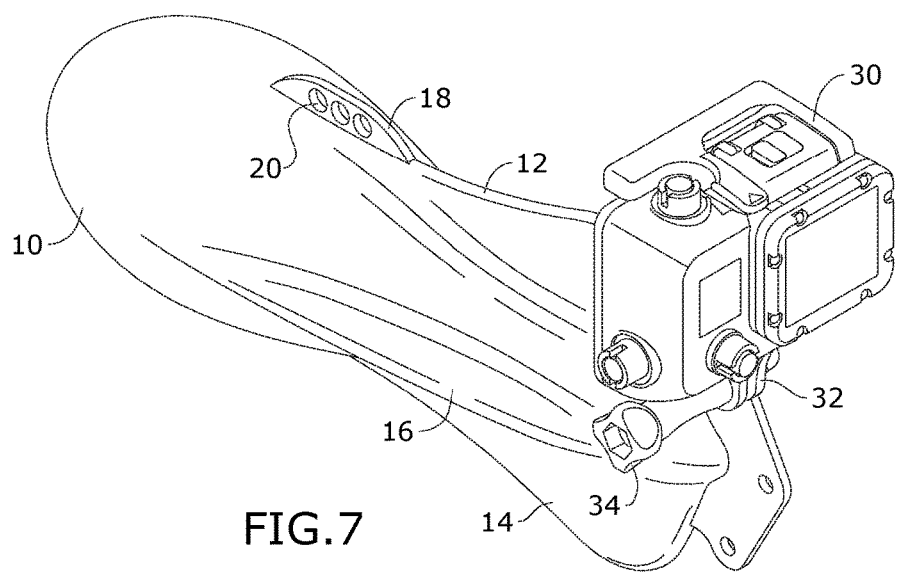
FIG. 7 shows a perspective view of one embodiment of the present invention, shown with an optional camera attached.
Figure 8:
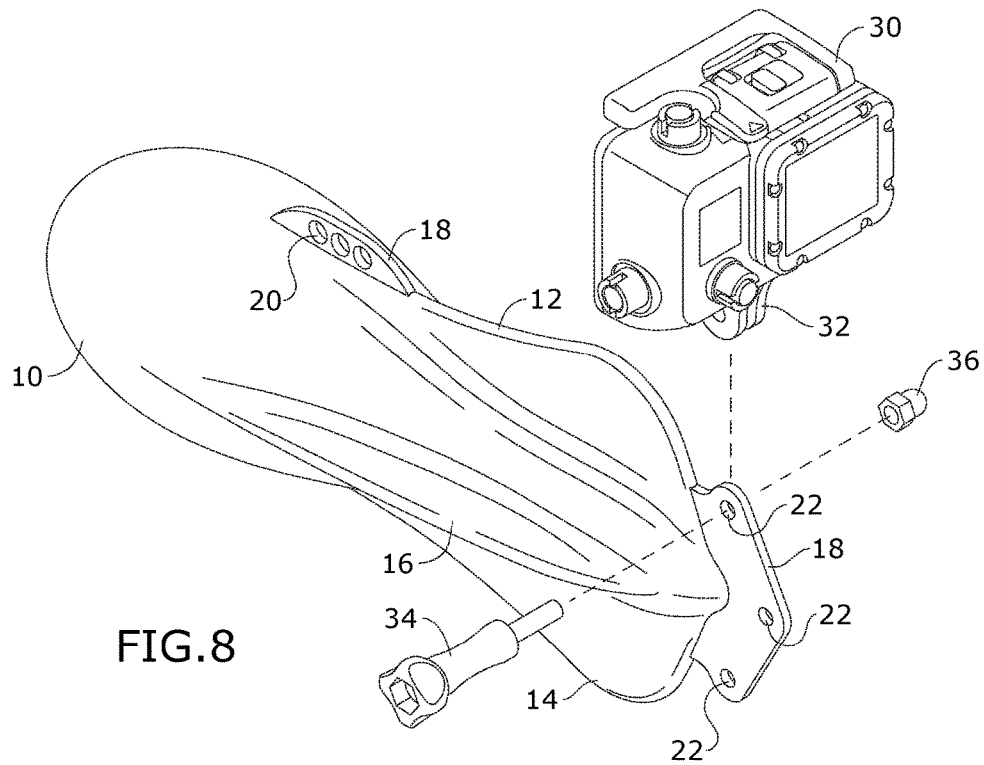
FIG. 8 shows an exploded view of the camera attachment.

The internal spine is attached to one of the plurality of fins, near the forward bulb. The upper attachment holes in the internal spine are useful for attaching cables to pull the trolling weight forward. Further, the tail fin extends through the rear end of the body and the rear attachment holes in the tail fin are useful for attaching accessories while still providing for the attachment of a release clip for the fishing line. The internal spine and the tail fin are connected to each other through the connectors, forming a single unit (FIG. 4). One of the connectors is a straight piece, attached to the tail fin at right angle while the other connector has a bend in the middle.

The rear attachment holes further comprise a top 30, a middle 32 and a bottom 34 hole. The top and the bottom holes are useful in attaching accessories to the tail fin, such as a reversible directional fin 36 and a camera in waterproof housing 38 while the middle is used for a release line connection. The reversible directional fin can be fastened to the tail fin using a plurality of fin bolts and corresponding fin nuts using the top and the bottom holes. The reversible directional fin can be employed to keep the weight tracking farther out from the boat. This is important when fishing with two or more lines in the water on the same side of the boat. Furthermore, the top attachment hole in the tail fin is useful for fastening an attachment fork on the camera using an attachment bolt and an attachment nut.

The trolling weight is an article of manufacture that allows one to attach a downrigger cable at the top and a release clip line to the tail fin to perform the trolling function in a highly efficient manner, keeping the bait or lure at the desired depth for much improved performance while fishing.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non- patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A trolling weight, designed to sink while minimizing drag; the trolling weight comprising:
   a forward bulb arranged as a paraboloid configured to reduce the drag while the trolling weight is moving; wherein the forward bulb truncates to a rearward portion
   a first stabilizing fin, attached to the forward bulb and further comprising a first smooth parabolic planar portion which convex from a first apex that connects the forward bulb and the rearward portion;
   an internal spine, attached to the first stabilizing fin, and further comprising a plurality of upper attachment holes configured to connect cables to pull the trolling weight forward;
   a tail fin, attached to, the internal spine by a plurality of connectors embedded within the forward bulb, and arranged rearward of the rearward portion of the forward bulb and further comprising a plurality of rear attachment holes for attaching accessories.

2. The trolling weight, of claim 1, further comprising:
   a second stabilizing fin, attached to the forward bulb and further comprising a second smooth parabolic planar portion which convex from a second apex that connects the forward bulb and the rearward portion.

3. The trolling weight, of claim 2, further comprising:
   a third stabilizing fin, attached to the forward bulb and further comprising a third smooth parabolic planar portion which convex from a third apex that connects the forward bulb and the rearward portion.

4. The trolling weight, of claim 3, further comprising:
   a fourth stabilizing fin, attached to the forward bulb and further comprising a fourth smooth parabolic planar portion which convex from a fourth apex that connects the forward bulb and the rearward portion.

5. The trolling weight, of claim 4, wherein the rear attachment holes further comprise a rear attachment top hole, a rear attachment middle hole and a rear attachment bottom hole.

6. The trolling weight, of claim 5, further comprising a reversible directional fin, attached to the rear attachment top hole and the rear attachment bottom hole.

7. The trolling weight, of claim 5, further comprising a camera attached to the rear attachment top hole.

8. The trolling weight, of claim 4, wherein one of the connectors connecting the internal spine and the tail fin perpendicularly.

* * * * *